Oct. 16, 1962 J. E. OLIVER 3,058,714
RESISTOR MOUNTING BRACKET
Filed Jan. 25, 1960
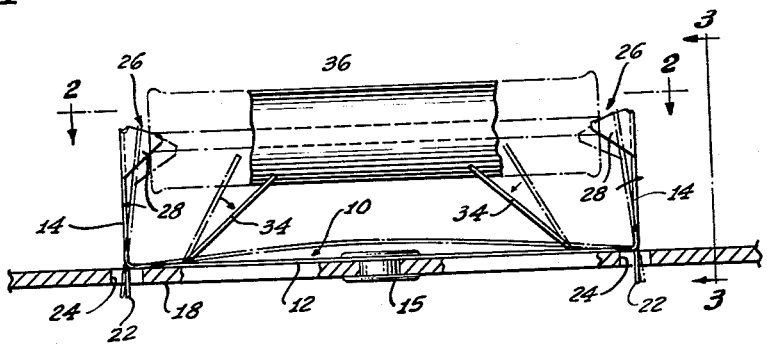
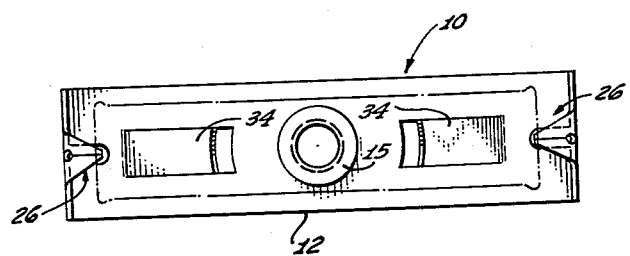
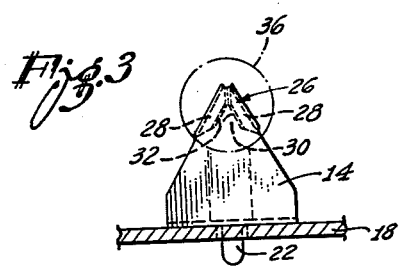
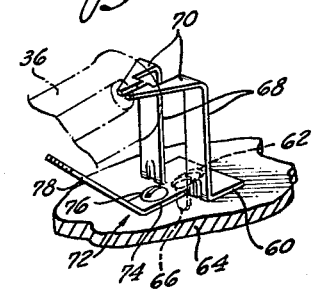
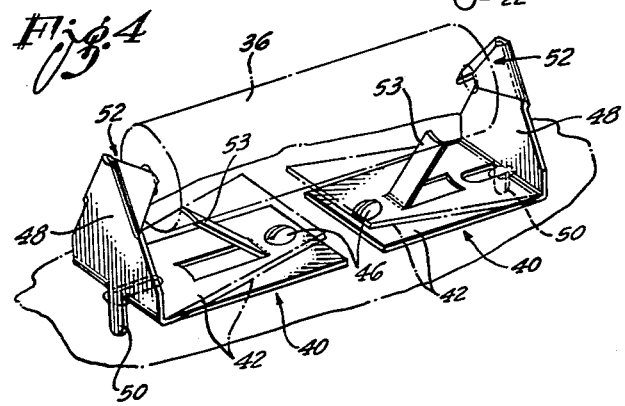
INVENTOR:
John E. Oliver
By Willard M. Graham
Agent.

3,058,714
RESISTOR MOUNTING BRACKET
John E. Oliver, Lakewood, Calif., assignor to Northrop Corporation, Beverly Hills, Calif., a corporation of California
Filed Jan. 25, 1960, Ser. No. 4,447
1 Claim. (Cl. 248—300)

This invention has to do with electronics and more particularly with a clip or clamp for holding and mounting hollow cylindrical objects such as certain types of resistors and the like.

Heretofore, equipment for holding and supporting electrical as well as electronic components such as hollow cylindrical resistors, have been difficult to assemble, relatively massive, expensive, and in the main not particularly suitable. Various factors, such as mass and rigidity, worked to a severe disadvantage. The mass became an undesirable factor when space was a premium. Rigidity and component rotation became an important factor when shock and vibration had to be given serious consideration. Cost is always an important factor.

An object of this invention is to provide a clip or clamp, for hollow cylindrical objects, that is relatively economical to manufacture, has resilience in operation, is relatively easy to handle and assemble, is relatively small in size, and is versatile with regard to holding and supporting various size objects.

Another object of this invention is to provide a clip or clamp, for hollow cylindrical objects, that is easily mounted and retained on an electronic chassis or the like.

A yet further object of this invention is to provide an integral, unitized clip or clamp for hollow cylindrical objects that will effectively reduce outside influences and restrain the object to prevent rotation or "hunting."

Briefly the invention broadly comprises a body that is generally U-shaped to be fastened to a chassis. The body includes a pair of opposed legs, integral with the bight of the body, each having inwardly projecting tangs or holding members.

Also integral with the body is at least one projection that is in biasing contact with the cylindrical object for the purpose of retaining the object in a preselected position. The hollow cylindrical object, to be held, is placed between the legs and tangs of the invention, which tangs are received in the open ends of the object. Downwardly extending tabs on the body are received in openings provided in the chassis. Upwardly projecting tabs assist in holding the object in the selected position and prevent rotation thereof.

FIGURE 1 is a fragmentary, side elevation view illustrating and having embodied therein the present invention.

FIGURE 2 is a plan view of the device taken on line 2—2 of FIGURE 1.

FIGURE 3 is an end elevation view taken on line 3—3 of FIGURE 1.

FIGURE 4 is a perspective view of another form of the invention.

FIGURE 5 is a perspective view illustrating and having embodied therein still another form of the invention.

Referring to the drawings for a more detailed description of the present invention 10 broadly designates an elongated U-shaped body. An arcuately or upwardly bowed bight 12 spans the distance between and is integral with a pair of spaced apart and identical legs 14. The end view, FIGURE 3, illustrates that each leg is generally triangular shaped. A fastener 15 is received in an opening provided in the bight 12 in order that the clip or clamp may be attached to some form of support 18 such as a chassis or the like.

A tab 22, integral with each leg, extends downwardly therefrom as may be seen by referring to FIGURES 1 and 3. Each tab is received in a tab receiving opening 24 that is formed in the chassis or support 18. The function of the tabs is to prevent rotation of the clip or clamp after it has been properly located.

An inwardly extending projection or object receiving member 26 is integral with the apex end of each leg 14. Each projection comprises a pair of truncated triangular tabs 28 that has one side in or near contacting relationship with the corresponding side of the adjacent tab. Due to the fact that each projection 26 is made up of a pair of truncated triangular tabs 28 a triangular gap 30 is provided between the apex ends of each projection. This gap is in linear alignment with the gap in the opposed projection. Further, each tab 28 has a knife edge 32 thereon.

Integral with the body 10, adjacent to but spaced from each leg 14 is an elongated, normally upwardly extending projection 34 that forms an acute angle with the body 10. Prior to the cylindrical object 36 being placed between the legs 14, in the manner illustrated in FIGURE 1, the projections 34, legs 14, and members 26 assume the dotted line positions.

The operation of the invention illustrated in FIGURES 1, 2 and 3 is as follows. The body 10 is mounted on a chassis or support 18. The bowed bight 12 is forced flat through the medium of the fastener. This forcing flat of the bight 12 urges the legs 14 inwardly toward each other. The result of urging the legs toward each other reduces the space between the legs and the component 36 must or should be forced into the position illustrated, in solid line in FIGURE 1. The tension imposed outwardly on the legs by the component results in the component being firmly held in position.

Additionally, each projection 34 being in biasing contact or engagement with the component or object 36 results in retaining the component in a preselected position. In other words, vibration and other outside forces very often causes the component 36 to rotate back and forth or "hunt." This can result in fracturing component leads. The projections 34 prevent rotation of the component 36.

The clip being an integral unit provides a reliable holding device for the component 36. If the mounted unit illustrated in FIGURE 1 is subjected to vibrations equal resonance will occur in all parts of the structure. Each leg and projection will resonate in the same direction as the opposed leg or projection and there will be little danger of the component being shaken loose or rotating. The tension created by the legs, projections, and component will tend to compensate for forces that may work in opposition to the established tension.

Attention is directed to FIGURE 4 and a modified form of the invention.

The entire clip is made up of a pair of identical L-shaped bodies 40. Due to the identity of the bodies only one will be described.

One elongated supporting leg 42 of the body has an opening therein to receive a fastener 46. It may be readily determined that the angle established between leg 42 and object leg 48 as illustrated in the dotted line position is acute. Therefore, when the leg 42 is fastened to the chassis 18, leg 48 is inclined toward the opposed mounted body 40. The body 40 has a tab 50 thereon that is identical to tab 22.

Additionally, each leg 48 has a projection 52 integral therewith. Projection 52 is identical to projection 26. Further, each elongated leg 42 has a projection 53 integral therewith that is identical to and has the same function as projections 34.

The operation of the invention illustrated in FIGURE 4 is as follows: The pair of bodies 40 are suitably mounted to the chassis 18 through the medium of the fasteners 46. The space between the projections 52 is less than the length of the component 36. As a result when the component is mounted as illustrated in FIGURE 4 the inclined legs 48 in combination with the component will provide sufficient tension to hold the component against such forces as may be induced to remove it. Also the projections 53, like projections 34, will prevent rotation of the component 36.

Attention is directed to FIGURE 5 and the modified form of the invention illustrated there.

The clip illustrated comprises a base or supporting leg 60 having an opening 62 therein and projecting downwardly from the opening and into a prepared support 64 is a tab 66.

Extending perpendicular to the base 60 are a pair of identical, parallel, and spaced apart object legs 68. Projecting perpendicular from the legs and being parallel to the base 60 are a pair of identical component receiving tangs 70. Being a pair of tangs that receive the component they can be squeezed together in such a manner as to provide a lateral force. They also will function in the same manner as tangs 26 and 52.

Also extending from the base 60 and located between the legs 68 is a generally L-shaped member 72. One leg 74 of the member is parallel to the tangs 70 and has an opening therein that receives a fastener 76. The other leg 78 extends upwardly toward the tangs 70 and functions in exactly the same manner as projections 34 and 53. In other words, projection or leg 78 is in biasing contact with the component 36 and prevents rotation or hunting.

The operation of the invention illustrated in FIGURE 5 is as follows: The clip or clamp is supported in the manner shown. The tab 66 is inserted into an opening in a chassis, panel, support or the like. The tangs 70 are inserted into the component 36 and the leg 78 is urged into biasing engagement with the component. Of course a duplicate clip is required for the opposite end of the component.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claim.

What is claimed is:

In combination with a hollow open ended cylindrical body, a mounting bracket comprising:
(a) a generally U-shaped resilient body having an upwardly bowed bight with a central fastener aperture therethrough adapted to be fastened to a surface,
(b) an integral upright leg at each end of said bight,
(c) a triangular tab projecting inwardly relative to said bight from the upper end of each of said legs,
(d) a resilient, generally rectangular tab integrally upstruck from said bight on each side of said central fastener aperture and inwardly from each of said legs to extend angularly upwardly over said bight, the upper ends of said tabs being substantially arcuately formed to fit around the periphery of a cylindrical body engaged thereby,
(e) a hollow cylindrical body mounted between said legs co-extensive with said bight with said triangular tabs on said legs extending into each open end of said cylindrical body, said upstruck tabs in said bight being long enough to extend beyond the outline of a cylindrical body supported between said legs so that when said body is mounted in said bracket the arcuate ends of said tabs are compressed downwardly to maintain sufficient upward force against the periphery of said cylindrical body to prevent rotational movement thereof in said bracket, said legs being urged further inwardly into the open ends of said cylindrical body as the bowed bight is compressed downwardly against a surface fastened thereto.

References Cited in the file of this patent

UNITED STATES PATENTS

| | | |
|---|---|---|
| 1,634,953 | McCune | July 5, 1927 |
| 2,151,799 | Richter | Mar. 28, 1939 |
| 2,325,712 | Shurmur | Aug. 3, 1943 |
| 2,477,274 | Trecek | July 26, 1949 |
| 2,541,828 | Peck | Feb. 13, 1951 |
| 2,873,082 | Gillespie | Feb. 10, 1959 |
| 2,909,354 | Bingham | Oct. 20, 1959 |